US009326498B2

(12) United States Patent
Lindsey

(10) Patent No.: US 9,326,498 B2
(45) Date of Patent: May 3, 2016

(54) HEATABLE ENCLOSURE FOR PEST ERADICATION

(75) Inventor: Michael David Lindsey, Fort Collins, CO (US)

(73) Assignee: JAB DISTRIBUTORS, LLC, Wheeling, IL (US)

(*) Notice: Subject to any disclaimer, the term of this patent is extended or adjusted under 35 U.S.C. 154(b) by 1138 days.

(21) Appl. No.: 13/232,156

(22) Filed: Sep. 14, 2011

(65) Prior Publication Data

US 2012/0060407 A1 Mar. 15, 2012

Related U.S. Application Data

(60) Provisional application No. 61/403,411, filed on Sep. 14, 2010.

(51) Int. Cl.
*A01M 1/20* (2006.01)
*A01M 1/22* (2006.01)
*A01M 19/00* (2006.01)

(52) U.S. Cl.
CPC .......... *A01M 1/2094* (2013.01); *A01M 1/20* (2013.01); *A01M 1/22* (2013.01); *A01M 19/00* (2013.01)

(58) Field of Classification Search
CPC ....... A01M 1/2094; A01M 1/00; A01M 1/20; A01M 1/22; A01M 19/00
USPC ........ 43/123, 132.1, 124, 121, 125, 140, 144, 43/107, 112; 219/200, 201, 218, 520–522, 219/524, 531, 533, 385–387
See application file for complete search history.

(56) References Cited

U.S. PATENT DOCUMENTS

| | | | | | |
|---|---|---|---|---|---|
| 1,498,655 | A | * | 6/1924 | Hauptman | 219/549 |
| 1,659,719 | A | * | 2/1928 | Blake | A61F 7/0241 |
| | | | | | 219/531 |
| 2,617,012 | A | * | 11/1952 | Westley | 219/201 |
| 3,140,387 | A | * | 7/1964 | Green | F24C 7/065 |
| | | | | | 219/532 |
| 3,501,619 | A | * | 3/1970 | Buiting | H01C 7/027 |
| | | | | | 219/386 |
| 3,624,346 | A | * | 11/1971 | Guth | 219/201 |
| 3,751,629 | A | * | 8/1973 | Eisler | 219/201 |

(Continued)

FOREIGN PATENT DOCUMENTS

| AT | DE 19836148 A1 * | 3/2000 | ............... H05B 3/36 |
|---|---|---|---|
| CA | 2 725 936 | 6/2011 | |

(Continued)

OTHER PUBLICATIONS

PCT, Notification Concerning Transmittal of International Preliminary Report on Patentability, in International Application No. PCT/US2012/054165, dated Mar. 27, 2014. (8 pages).

(Continued)

*Primary Examiner* — Darren W Ark
(74) *Attorney, Agent, or Firm* — McAndrews, Held & Malloy, Ltd.

(57) ABSTRACT

Disclosed are heatable enclosures useful in treating materials for eradication of pests. Specifically, a heating layer which can be fitted or retrofitted into a numerous and wide variety of containers and enclosures, such as suitcases, boxes, trucks and trailers, which are operable to heat the enclosed space of the container to treat heatable materials over a period of time to eradicate pests. Heating films can be utilized that are inexpensive and lightweight.

20 Claims, 11 Drawing Sheets

(56) References Cited

U.S. PATENT DOCUMENTS

| | | | |
|---|---|---|---|
| 4,063,068 A | 12/1977 | Johnson et al. | |
| 4,074,456 A * | 2/1978 | Tidwell | 43/112 |
| 4,144,668 A * | 3/1979 | Darncharnjitt | 43/112 |
| 4,162,695 A * | 7/1979 | Moses | 219/201 |
| 4,163,896 A * | 8/1979 | McAvinn et al. | 219/521 |
| 4,523,078 A * | 6/1985 | Lehmann | 219/202 |
| 4,630,671 A * | 12/1986 | Sherman et al. | 165/61 |
| 4,709,502 A * | 12/1987 | Bierman | 43/112 |
| 4,780,985 A * | 11/1988 | Coots | 43/98 |
| 4,806,736 A * | 2/1989 | Schirico | 219/521 |
| 4,839,984 A * | 6/1989 | Saunders et al. | 43/112 |
| 4,916,290 A † | 4/1990 | Hawkins | |
| 4,927,995 A * | 5/1990 | Lovett et al. | 219/521 |
| 5,397,875 A * | 3/1995 | Bechtold, Jr. | 219/521 |
| 5,497,883 A * | 3/1996 | Monetti | A47J 39/006 219/387 |
| 5,569,401 A * | 10/1996 | Gilliland et al. | 219/521 |
| 5,732,503 A * | 3/1998 | Cheng | 43/112 |
| 5,736,714 A * | 4/1998 | Bechtold, Jr. | A45C 15/00 219/524 |
| 5,961,869 A | 10/1999 | Irgens | |
| 5,977,520 A * | 11/1999 | Madson, Jr. | A61F 7/0241 219/429 |
| 6,009,662 A * | 1/2000 | Chang | 43/112 |
| 6,018,143 A * | 1/2000 | Check | 219/529 |
| 6,028,293 A * | 2/2000 | Nagle et al. | 219/523 |
| 6,108,489 A † | 8/2000 | Frohlich | |
| 6,142,974 A † | 11/2000 | Kistner | |
| 6,222,160 B1 * | 4/2001 | Remke et al. | 219/528 |
| 6,262,394 B1 † | 7/2001 | Shei | |
| 6,300,599 B1 * | 10/2001 | Owens et al. | 219/387 |
| 6,327,812 B1 | 12/2001 | Hedman et al. | |
| 6,337,080 B1 | 1/2002 | Fryan et al. | |
| 6,384,380 B1 * | 5/2002 | Faries et al. | 219/385 |
| 6,713,727 B1 * | 3/2004 | Johnson | 219/201 |
| 6,723,960 B2 * | 4/2004 | DiMartino et al. | 219/386 |
| 6,822,198 B2 * | 11/2004 | Rix | 219/201 |
| 6,936,791 B1 * | 8/2005 | Baldwin et al. | 219/521 |
| 6,989,517 B2 * | 1/2006 | Owens et al. | 219/387 |
| 7,076,915 B1 | 7/2006 | Brooks et al. | |
| 7,161,120 B1 * | 1/2007 | Stroud et al. | 219/386 |
| 7,230,212 B1 * | 6/2007 | Sarkisian et al. | 219/521 |
| 7,316,313 B1 * | 1/2008 | Juchau | 206/315.1 |
| 7,363,746 B2 * | 4/2008 | Spies et al. | 43/132.1 |
| RE40,290 E † | 5/2008 | Shei | |
| 7,622,695 B2 * | 11/2009 | DiPucchio et al. | 219/385 |
| D614,725 S | 4/2010 | James | |
| 7,777,157 B2 * | 8/2010 | Jenkins | 219/386 |
| 7,880,121 B2 | 2/2011 | Naylor | |
| 8,143,553 B2 * | 3/2012 | DeFranco et al. | 219/201 |
| 8,168,923 B2 * | 5/2012 | Wong et al. | 219/387 |
| 8,633,425 B2 * | 1/2014 | Naylor et al. | 219/213 |
| 8,689,481 B2 * | 4/2014 | Lindsey | 43/132.1 |
| 8,742,296 B2 * | 6/2014 | Bermudez | 43/132.1 |
| 2003/0049025 A1 | 3/2003 | Neumann et al. | |
| 2006/0027557 A1 * | 2/2006 | Peterson et al. | 219/386 |
| 2008/0115406 A1 | 5/2008 | Duston et al. | |
| 2009/0145019 A1 | 6/2009 | Nolen et al. | |
| 2009/0145020 A1 | 6/2009 | McKnight | |
| 2009/0282728 A1 | 11/2009 | McKnight et al. | |
| 2010/0212088 A1 * | 8/2010 | Deighan | 5/421 |
| 2010/0329649 A1 * | 12/2010 | Potter | F24H 9/2071 219/494 |
| 2011/0006080 A1 | 1/2011 | Naylor et al. | |
| 2011/0012726 A1 | 1/2011 | Jessiman et al. | |
| 2011/0113674 A1 * | 5/2011 | Levy | 43/132.1 |
| 2011/0186558 A1 * | 8/2011 | Campbell | H05B 3/34 219/201 |
| 2011/0196548 A1 | 8/2011 | Potter | |
| 2011/0289825 A1 * | 12/2011 | James | 43/132.1 |
| 2011/0308139 A1 * | 12/2011 | James | 43/132.1 |
| 2011/0315672 A1 | 12/2011 | Benda et al. | |
| 2012/0060407 A1 | 3/2012 | Lindsey | |
| 2012/0192479 A1 * | 8/2012 | Schmitz | 43/132.1 |
| 2012/0233907 A1 * | 9/2012 | Pattison et al. | 43/124 |
| 2012/0240451 A1 * | 9/2012 | Ricks | 43/132.1 |
| 2013/0269239 A1 * | 10/2013 | Whitley et al. | 43/132.1 |
| 2013/0276358 A1 * | 10/2013 | Knote et al. | 43/132.1 |
| 2014/0026469 A1 * | 1/2014 | Balcarek et al. | 43/132.1 |
| 2014/0041284 A1 * | 2/2014 | Nugent | 43/132.1 |
| 2014/0290124 A1 * | 10/2014 | Aidan | 43/132.1 |
| 2015/0052800 A1 * | 2/2015 | Timbrook et al. | 43/132.1 |
| 2015/0223443 A1 * | 8/2015 | Lindsey | A01M 1/2094 43/124 |
| 2015/0230622 A1 * | 8/2015 | Orbelian | A47C 31/007 43/132.1 |

FOREIGN PATENT DOCUMENTS

| | | |
|---|---|---|
| DE | 198 36 148 | 3/2000 |
| GB | 2077958 A | 12/1981 |
| JP | 2000116301 | 4/2000 |
| JP | 2004049194 | 2/2004 |
| WO | 2010096184 | 8/2010 |
| WO | 2011097086 A2 | 8/2011 |

OTHER PUBLICATIONS

PCT, Notification of Transmittal of the International Search Report and the Written Opinion of the International Searching Authority, or the Declaration, in International Application No. PCT/US2012/054165, dated Dec. 7, 2012. (14 pages).

PCT, Notification of Transmittal of the International Search Report and the Written Opinion of the International Searching Authority, or the Declaration, in International Application No. PCT/US2012/069166, dated Feb. 22, 2013 (12 pages).

Supplementary European Search Report corresponding to European Patent Application No. EP 12 83 2217, mailed Mar. 25, 2015.

James, David, Packtite Assembly & Operating Instructions Manual, Sep. 2008, Nuvenco, Inc.†

\* cited by examiner
† cited by third party

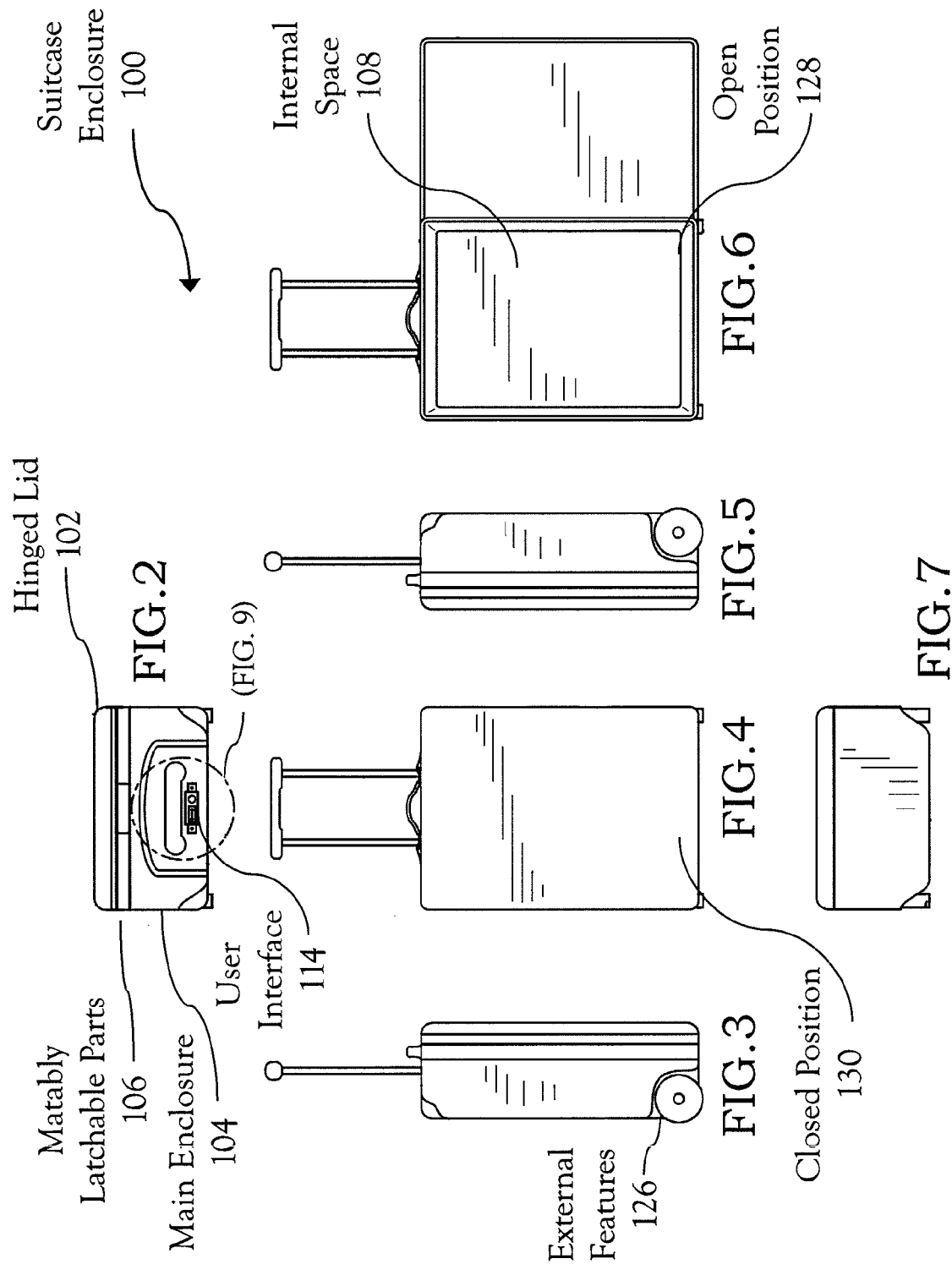

HEATABLE ENCLOSURE FOR PEST ERADICATION

CROSS-REFERENCE TO RELATED APPLICATION

The present patent application is based upon and claims the benefit of U.S. Provisional Patent Application Ser. No. 61/403,411, filed on Sep. 14, 2010, by Michael David Lindsey, entitled "Heatable Enclosure for Pest Eradication," which is hereby specifically incorporated herein by reference for all that it discloses and teaches.

BACKGROUND

Pest and insect damage to materials, fabrics, and garments is a growing problem. As a non-limiting example, insect damage to textiles in the United States is estimated at $200 million annually. Fabric and garment insect infestations are making a comeback because most of the insecticides formerly used to control insects and pests, such as dieldrin and dichlorodiphenyltrichloroethane ("DDT"), have been banned.

Accordingly, as people travel, or as containers are shipped from location to location, there is a growing incidence of pest or insect infestation of garments transported in luggage and materials shipped in containers. For example, bed bugs may be found in many hotels, motels, homes, or other accommodations, even in highly sanitary conditions. During the day, nocturnal insects, such as bedbugs, disappear in crevices associated with mattresses, box springs, sheets, upholstery, garments, clothes, pillows, towels, or the like. Even when these materials are examined, it is common for these insects, or the eggs of these insects, to go undetected and packed with garments and transported in luggage.

SUMMARY OF THE INVENTION

An embodiment of the present invention may therefore comprise a system for killing pests on heatable materials comprising: an enclosure that is adapted to receive the heatable materials, the enclosure having an exterior surface and an interior surface that surrounds an interior space of the enclosure; a heating film that generates infrared radiation comprising a resistive material that is disposed on a substrate, the heating film disposed in the interior space of the enclosure; an insulating layer disposed between the heating film and the interior surface of the enclosure; and a control device, that is operatively coupled to the heating film, that controls current flowing through the heating film so that the infrared radiation penetrates and heats the heatable materials disposed in the enclosure to a sufficiently high temperature, for a sufficiently long period, to kill the pests.

An embodiment of the present invention may further comprise a method of killing pests on heat treatable materials comprising: providing an enclosure that is adapted to receive the heatable materials, the enclosure having an exterior surface and an interior surface that surrounds an interior space of the enclosure; providing a heating film that generates infrared radiation comprising a resistive material that is disposed on a substrate, the heating film disposed in the interior space of the enclosure; providing an insulating layer disposed between the heating film and the interior surface of the enclosure; and providing a control device that is operatively coupled to the heating film, that controls current flowing through the heating film so that the infrared radiation penetrates and heats the heatable materials disposed in the enclosure to a sufficiently high temperature for a sufficiently long period to kill the pests.

An embodiment of the present invention may further comprise a system for killing pests on heatable materials comprising: an enclosure that is adapted to receive the heatable materials, the enclosure having an exterior surface and an interior surface that surrounds an interior space of the enclosure; a resistive wire heating layer that generates heat by Joule heating comprising a resistive material that is disposed on a substrate, the heating layer disposed in the interior space on multiple surfaces of the enclosure; an insulating layer disposed between the heating film and the interior surface of the enclosure; and a control device, that is operatively coupled to the heating layer, that controls current flowing through the heating layer so that the infrared radiation penetrates and heats the heatable materials disposed in the enclosure to a sufficiently high temperature, for a sufficiently long period, to kill the pests.

An embodiment of the present invention may further comprise a method of killing pests on heat treatable materials comprising: providing an enclosure that is adapted to receive the heatable materials, the enclosure having an exterior surface and an interior surface that surrounds an interior space of the enclosure; providing a resistive wire heating layer that generates heat by Joule heating comprising a resistive material that is disposed on a substrate, the heating film disposed in the interior space on multiple surfaces of the enclosure; providing an insulating layer disposed between the heating layer and the interior surface of the enclosure; and providing a control device that is operatively coupled to the heating layer, that controls current flowing through the heating layer so that the heat penetrates and heats the heatable materials disposed in the enclosure to a sufficiently high temperature for a sufficiently long period to kill the pests.

A BRIEF DESCRIPTION OF THE DRAWINGS

FIG. 2 is an end view of the embodiment of the heatable enclosure of FIG. 1.

FIG. 3 is a left side view of the embodiment of the heatable enclosure of FIG. 1.

FIG. 4 is a top view of the embodiment of the heatable enclosure of FIG. 1 having a releasably sealable access element in a closed condition.

FIG. 5 is a right side view of the embodiment of the heatable enclosure of FIG. 1.

FIG. 6 is a top view of the embodiment of the heatable enclosure of FIG. 1 having a releasably sealable access element in an open condition.

FIG. 7 is an opposite end view of the embodiment of the heatable enclosure of FIG. 1.

DETAILED DESCRIPTION OF THE PREFERRED EMBODIMENTS

Figure 1:
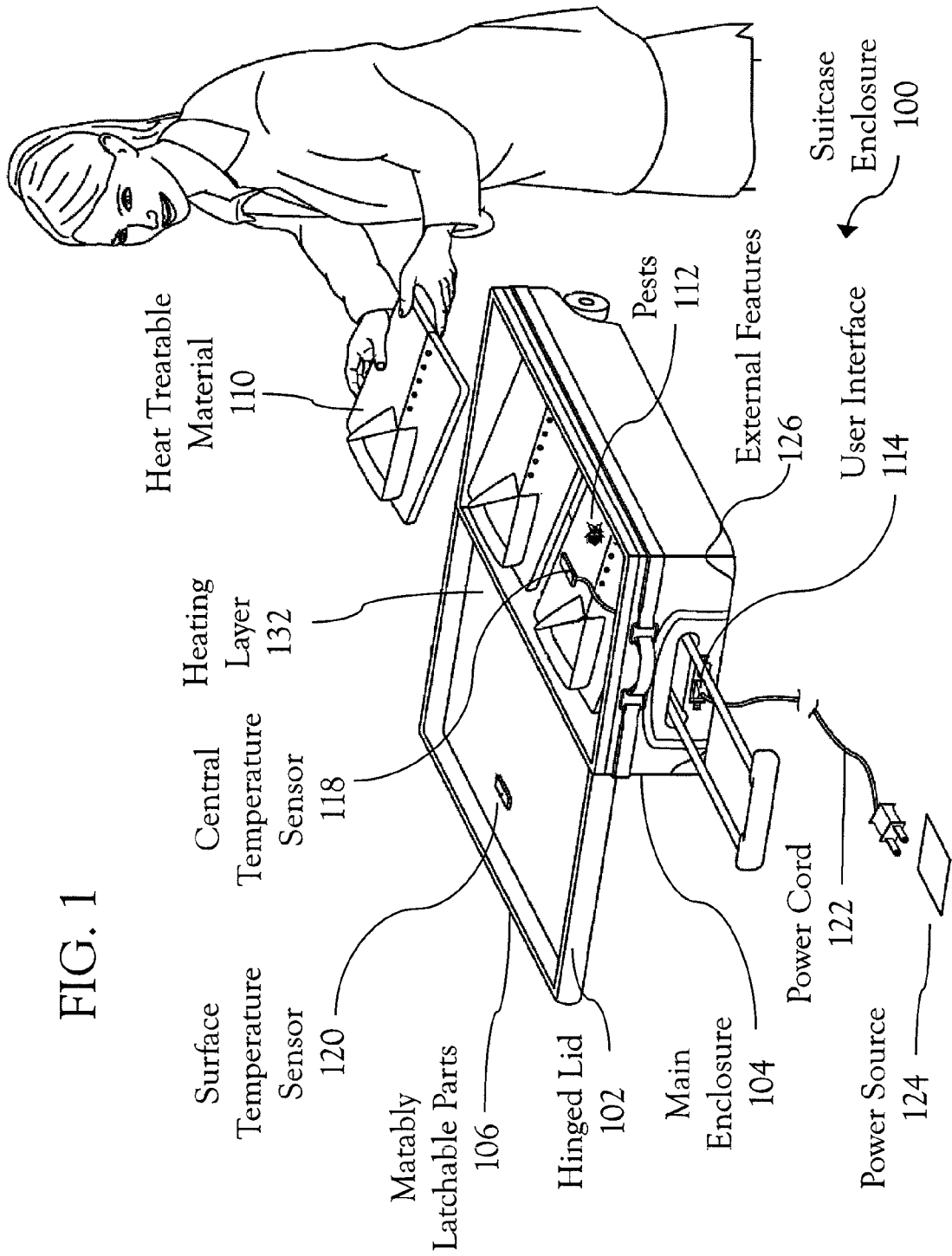
FIG. 1 is an illustration of an embodiment of a heatable enclosure for pest eradication.

FIG. 1 is a perspective view of an embodiment of a suitcase enclosure 100 that can be heated to kill pests 112. Heat-treatable materials, such as shirts, clothing and other items, can be placed in the main enclosure 104 of the suitcase enclosure 100 for heat treatment. Certain pests such as bedbugs may hide in clothing and other items that are transported by suitcases, or on the external surfaces of the suitcase. To ensure that the transported items, such as the heat treatable material 110, do not contain pests such as bedbugs, the heat treatable material 110 is placed within the suitcase enclosure 100, which heats the heat treatable material 110 to a temperature that kills the pests. The suitcase enclosure 100 includes a main enclosure 104 and a hinged lid 102 that attaches to the main enclosure 104 using matably latchable parts 106. The surfaces of the main enclosure 104 and hinged lid 102 include heating layer 132 that heat the main enclosure 104 to specified temperature for a sufficient amount of time to kill the pests. Surface temperature sensor 120 senses the interior surface temperature of various surfaces within the suitcase enclosure 100, including the hinged lid 102. A power cord 122 is connected to the user interface 114 of the suitcase enclosure 100. Power cord 122 is plugged into an external power source 124 to obtain power to heat the suitcase enclosure 100 using the heating layer 132. User interface 114 is used to control the process of heating the suitcase enclosure 100. A central temperature sensor 118 senses the temperature in a central portion of the main enclosure 104. The central temperature sensor 118 can be placed in any desired location in the main enclosure 104 to detect temperatures within the suitcase enclosure 100 to ensure that a sufficiently high temperature is reached for a sufficiently long time to kill the pests.

For example, a user may wish to obtain central target temperatures ranging from approximately 120° F. to approximately 150° F. for a period of between 30 minutes and an hour for the purpose of killing pests, such as bedbugs, contained within the main enclosure 104. To fulfill this requirement, simple programming controls can be entered by a user through the user interface 114. The user interface 114 can be used to program the central target temperature, wall temperatures, and/or length of time that heat is applied to the suitcase enclosure 100. It has been empirically determined that maintaining a temperature of 120 degrees for a period of one minute will kill bedbugs. However, extended heat treatment, such as disclosed above, will ensure that the required elevated temperatures are reached in all portions of the main enclosure 104 for a sufficient time to kill pests, such as bedbugs and their eggs. Further, when elevated temperatures are maintained for a period of time in the suitcase enclosure 100, the heat permeates the structure of the suitcase enclosure 100, so that the external surfaces of the suitcase enclosure 100 also become heated. As the external surfaces of the suitcase enclosure 100 become heated, the pests, including bedbugs, will egress from the outer surfaces and external features 126 of the suitcase enclosure 100 and eggs will be destroyed. In this manner, the pests 112 are exterminated in the inside and egress, or are exterminated on outer surfaces of the suitcase enclosure 100. This process can be performed at a remote location from the user's home to prevent transportation of the pests to the user's home. For example, the user may activate the user interface 114 in a hotel room prior to leaving the hotel room, or in an airport or other remote location. Alternatively, the process can be performed at the user's home employing methods to contain the pests 112 to prevent egress into the home. The pests 112 are either killed or egress from the outside surfaces of the suitcase enclosure 100 prior to being transported back to the user's home. In that regard, the user interface 114 can be used to change both the duration time of the heating cycle and/or the temperature of the heating cycle within the suitcase enclosure 100. During the heating cycle that is set by the user interface 114, the hinged lid 102 is preferably secured to the main enclosure 104 using the matably latchable parts 106. In this manner, the heating layer 132 can concentrate the heat within the interior portion of the main enclosure 104. User interface 114 can provide a display that presents the interior temperature sensed by central temperature sensor 18, surface temperatures sensed by surface temperature sensor 120, and elapsed time. After the heat cycle has been performed, additional heat cycles can be employed if desired by the user. Further, heat treatable material 110 can be then removed from the suitcase enclosure 100, and additional heat treatable material 110 can be placed in the suitcase enclosure 100 for treatment.

FIGS. 2-7 comprise various views of the suitcase enclosure 100. FIG. 2 is a top end view of the suitcase enclosure 100. As shown in FIG. 2, the matably latchable parts 106 secure the hinged lid 102 to the main enclosure 104. The matably latchable parts 106 may comprise a zipper, latches, snaps, seal or other means of mating the hinged lid 102 to main enclosure 104. FIGS. 3, 4, 5, 6 and 7 illustrate the different sides of the suitcase enclosure 100 and show external features 126, such as seams, corner guards, or wheels. In that regard, the suitcase enclosure 100 may take any desired form or shape. In addition, the suitcase enclosure 100 may comprise other types of portable enclosures for treating heat treatable material 110. In addition, suitcase enclosure 100 may be large enough to treat not only clothing, shoes and other types of personal items, but also items such as sheets and blankets, jackets and coats and other larger items. Clearly, one of the advantages of the suitcase enclosure 100 is that it is a portable, self-contained unit that is capable of connecting to a power source, such as a wall plug. In addition, the suitcase enclosure can be implemented to attach to other power sources, such as 12 or 24 volt outputs, such as through a cigarette lighter disposed on a vehicle, such as a car, truck, boat, etc.

Figure 8:
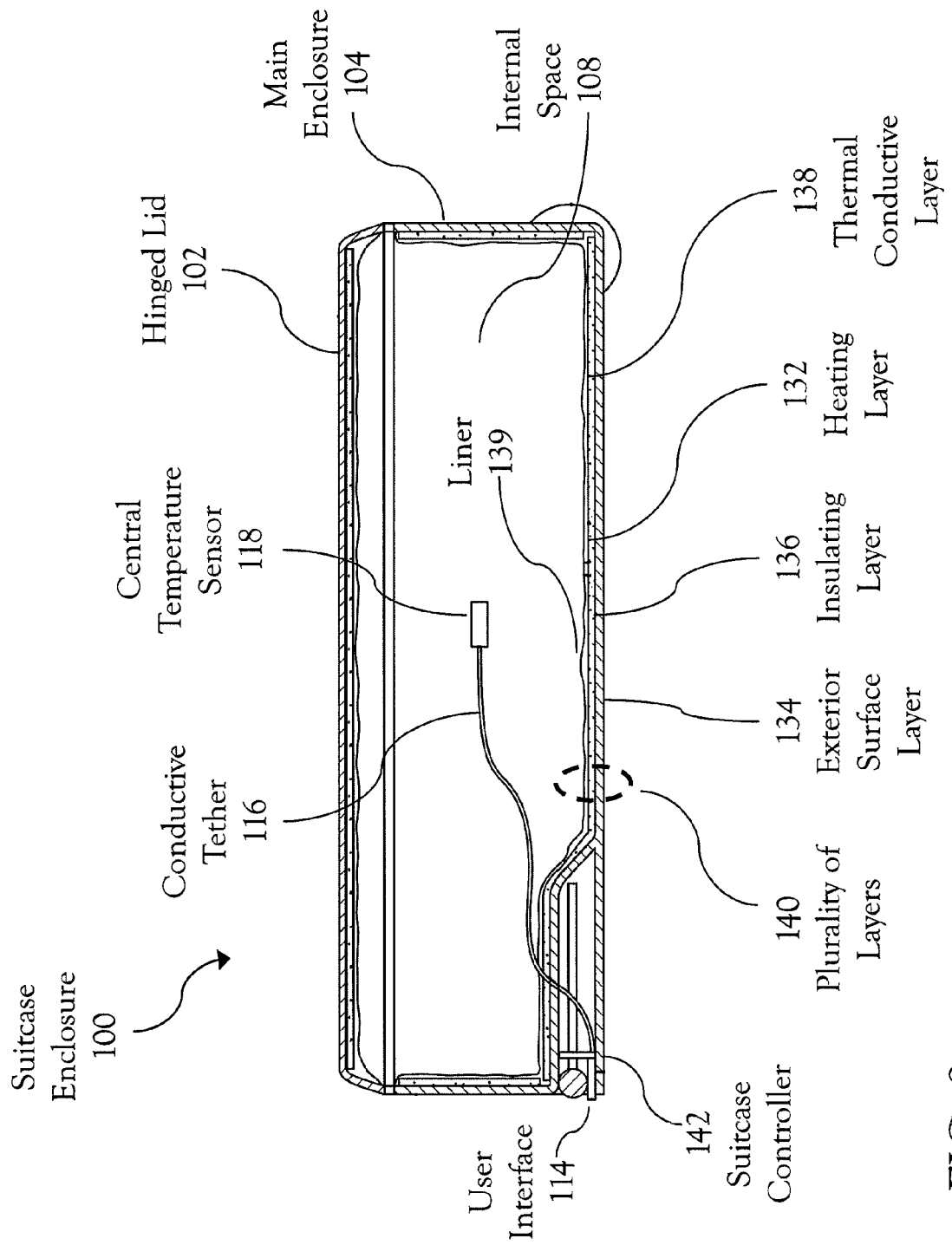
FIG. 8 is a cross section of the embodiment of FIG. 1.

FIG. 8 is a cross-sectional view of the suitcase enclosure 100 illustrating the various parts and construction of the suitcase enclosure 100. As illustrated in FIG. 8, the suitcase enclosure 100 includes a hinged lid 102 and main enclosure 104 that form an internal space 108. A movable central temperature sensor 118 is connected to a conductive tether 116, which allows the central temperature sensor 118 to be placed in any desired location within the internal space 108 of the suitcase enclosure 100. The main enclosure 104, as well as the hinged lid 102, include a plurality of layers 140. Exterior surface layer 134 can be made from a canvas, plastic, leather, or other materials commonly used in the manufacturing of luggage. An insulating layer 136 is disposed on the external layer 134. The insulating layer 136 assists in insulating the internal space 108 from the exterior surface layer 134 and traps the majority of the heat generated within the internal space 108 while transferring some amount of heat to the exterior surface layer 134. A heating layer 132 is disposed over the insulating layer 136. The heating layer 132 may comprise a heating film, such as heating film available from Korean Heating Company, Ltd., 1513-5 Dadae-Dong, Saha-Gu, Busan, South Korea; telephone number 82-51-264-2626; fax number 82-51-264-1626, Daewoo Electric Heating Company, Ltd., 188-1, Jangsa-Dong, Jongro-Gu, Seoul, South Korea; telephone number 82-2-2268-2011; fax number 82-2-6442-1963, or SEGGI CENTURY, Rm 908, Mugwang office building 1141-1, Jung-dong, Wonmi-gu, Bucheon-SI, Gyeonggi-do, South Korea; telephone number 82-32-3286699; fax number 82-32-3286464. As illustrated in FIG. 8, the heating layer 132 is disposed on all sides of the suitcase enclosure 100. The application of heat from multiple surfaces allows the entire contents of the enclosure to be treated, to ensure that the pests 112 are killed and that pests on the outside of the suitcase enclosure 100 are either killed or egress from the surfaces of the suitcase enclosure 100.

A heating film can be produced by screen printing an electrically resistive ink onto a substrate so that a plurality of narrow circuit lines are produced in the substrate. The resistive ink then generates radiated heat in the IR spectrum that is capable of penetrating much of the contents of enclosure 100. In this manner, standard convection of air through the internal space 108 of suitcase enclosure 100 is not relied upon for distribution of heat. Infrared radiation absorbed by the heat treatable materials 110 in conjunction with thermal conduction ensures that the necessary temperatures are achieved throughout the internal space 108 in the main enclosure 104. Of course, the materials used as resistive materials in the resistive ink of the heating film can be varied to create longer wave IR signals that are even more efficient at penetrating the heat treatable material 110.

Figure 16:
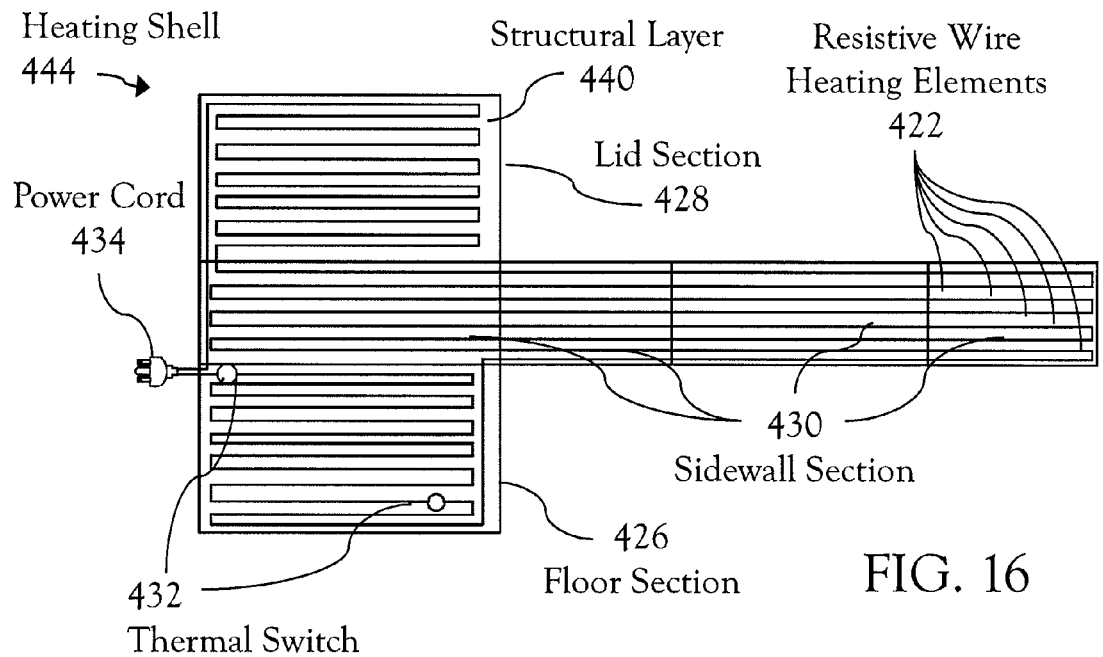
FIG. 16 is a top view of a heating element that uses resistive wires.

Alternatively, heating layer 132 can be constructed from a resistive wire heating element, which is more fully disclosed with respect to FIG. 16. A thermal conductive layer 138 is placed over the heating layer to increase the heat uniformity to the internal space 108. A liner 139 may be placed over the thermal conductive layer 138. The liner 139 is capable of transmitting heat generated from the thermal conductive layer 138 to the internal space 108.

The heating film has additional advantages for application in the suitcase enclosure 100. The heating film is mass-produced using inexpensive screen printing techniques. A very uniform heating profile can be generated using heating films as a result of easily instituted process controls that easily maintain consistent mixtures and uniform distribution of the resistive materials throughout the screen applied inks. Alternatively, non-uniform heating profiles may be designed into the screen printing process to address hot spots or cold spots in the application. Further, the heating films are extremely thin, i.e., on the order of 0.25 mm. As such, the heating films are lightweight and moderately pliable to shapes that will fit the suitcase enclosure 100. The operating temperatures of the film are in the range of 70 to 80° C., which is ideally suited for killing pests 112. The extremely light weight of the heat films adds virtually no detectable weight to the overall suitcase enclosure 100 and other portable devices in which the heating film can be used. Of course, the weight of a suitcase and other portable devices is an important factor to the marketing and sale of these devices. The addition of a very small and virtually undetectable amount of weight to a suitcase that has the ability to kill pests, as well as providing these solutions at only a moderately higher price, is an advantage in the sale and marketing of the suitcase enclosure 100. The implementation of heat films in commercial products, in addition, does not face substantial impediments. Heat films are UL, CE and CSA approved. The construction of the films allows for easy modification for various power densities and voltages. Application techniques to the substrate allow for minimum gap between the heating elements in a simple and cost effective manner. Current films are available in 30, 50, 60, 80 and 100 cm widths that are easily modified to provide designs that fit exactly into any desired enclosure.

Alternatively, a heating film can be directly applied to a substrate layer that forms a portion of the main enclosure 104 and hinged lid 102 of the suitcase enclosure 100. As indicated above, the heating film may be applied to a substrate layer, which may simply comprise the exterior surface layer 134, using lithographic techniques, silk screening techniques or other techniques in which the resistive ink is applied directly to the substrate. In addition, a protective layer that has a reasonably high thermal conductivity can be applied directly over the applied resistive ink to provide a protective layer for the resistive ink. Spray-on plastics and other materials can be used to protect the resistive ink. For example, polyurethanes and polyureas can be used, as well as other protective films. Any thin film polymer, including polyethylene, polypropylene and similar polymers, can provide sufficient protection of the conductive/resistive ink layer. The polymer can have a thickness that is sufficient to conduct the infrared radiation, while still providing protection to the conductive/resistive ink. The polymer layer can be thin enough to allow conduction of the heat through the polymer layer and not providing a significant insulation to the heating element.

FIG. 8 also illustrates the suitcase controller 142 and the user interface 114. The suitcase controller 142 may comprise a simple and inexpensive microprocessor controller that is easily programmable to operate with the user interface 114. The user interface may comprise an inexpensive touch screen display, or a combination of LEDs and buttons, that can be utilized for input of user data. Both the user interface 114 and the suitcase controller 142 are inexpensive and can be readily programmed to perform the required control functions.

Figure 9:
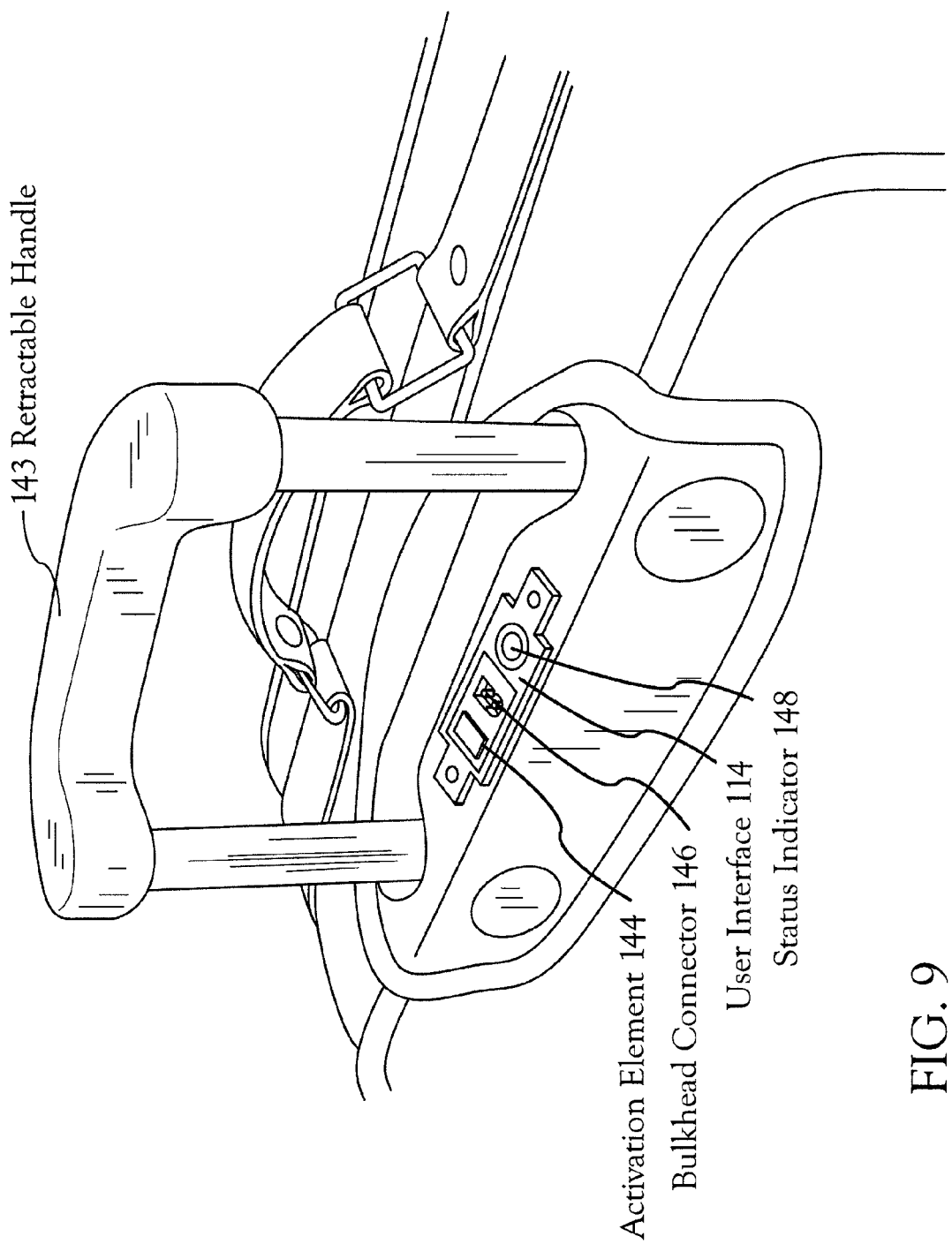
FIG. 9 is an isometric, enlarged view of the heatable enclosure user interface utilized in the embodiment of the heatable enclosure illustrated in FIG. 1.

FIG. 9 is a perspective view of one embodiment of a user interface 114. As shown in FIG. 9, the user interface is disposed in a location beneath the retractable handle 143, which assists in protecting the user interface 114 from damage or accidental activation. In the embodiment illustrated in FIG. 9, an activation element 144, in the form of a button, is utilized for the input of user data or to initiate a heat cycle. Bulkhead connector 146 provides a connector for connecting the external power source. Status indicator 148 may comprise any desired type of display for displaying operational data of the suitcase enclosure 100.

Figure 10:
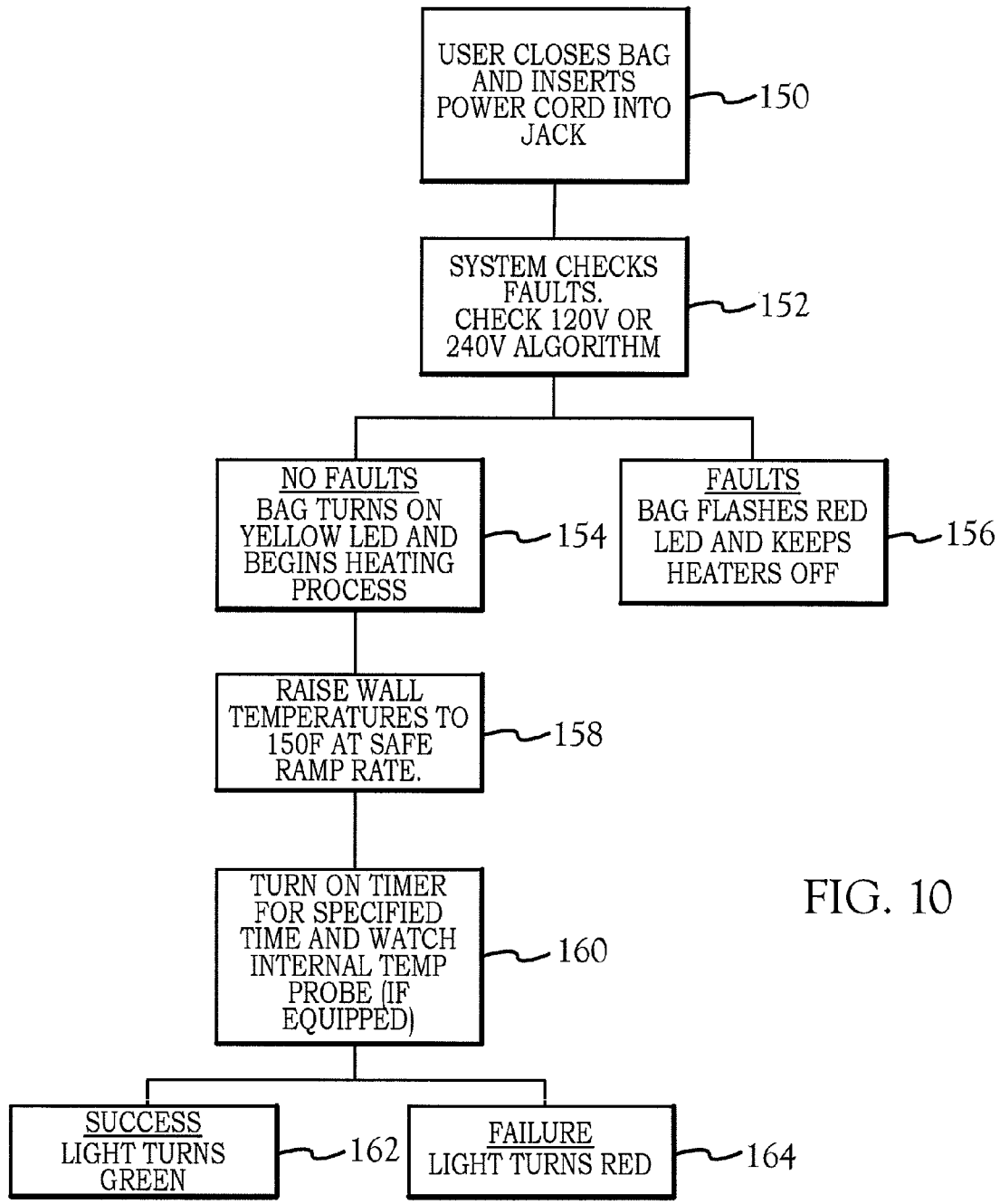
FIG. 10 is a flow diagram of an embodiment of a method of using a heatable enclosure.

FIG. 10 is a flow diagram illustrating the operational steps of suitcase controller 142, as well as the workflow steps of a user of the suitcase enclosure 100. At step 150, the user closes a bag and inserts a power cord into the jack that is disposed in the bulkhead connector 146. At step 152, the suitcase controller 142 checks for system faults and determines whether the source of power is either 120 volts or 240 volts AC. Additionally, the controller can also test for 12 volt DC and 24 volt DC power inputs. If it is determined that faults exist, or there are other operational problems with the system, the user interface can provide an indication of the fault. In one example, the user interface may flash a red LED and maintain the heating element in an off condition. If it is determined at step 152 that no faults or system problems exist, the heating elements are turned on and the heating process begins. An indication that the bag is operating and other data may also be displayed. In one example, a yellow LED may be illuminated. At step 158, the wall temperatures of the suitcase enclosure 100 are raised to a predetermined temperature level at a safe ramp rate. In the embodiment illustrated in FIG. 10, the wall temperatures are raised to a temperature of 150° F. At step 160, the suitcase controller 142 initiates a timer for a pre-selected time period for operation of the heating element. Alternatively, a user may specify a time period and may specify a repeating interval for heating the suitcase enclosure 100. In addition, the suitcase controller 142 monitors the temperatures from the central temperature sensor 118 and the surface temperature sensor 120. The suitcase controller 142 may turn the heating element on and off to maintain the desired temperature, for example, 150° F., during the heating interval. Once the heating interval is completed, the user interface 114 may indicate a successful heating interval process to the user. In one embodiment, a green light may be illuminated by the suitcase controller 142 in the user interface 114. If the heating interval is interrupted because a problem exists, such as the central temperature sensor 118 or the surface temperature sensor 120 detects overheating, the heating element is switched off and the failure of the heating interval is indicated on the user interface 114. In the example of FIG. 10, a red LED is illuminated.

Figure 11:
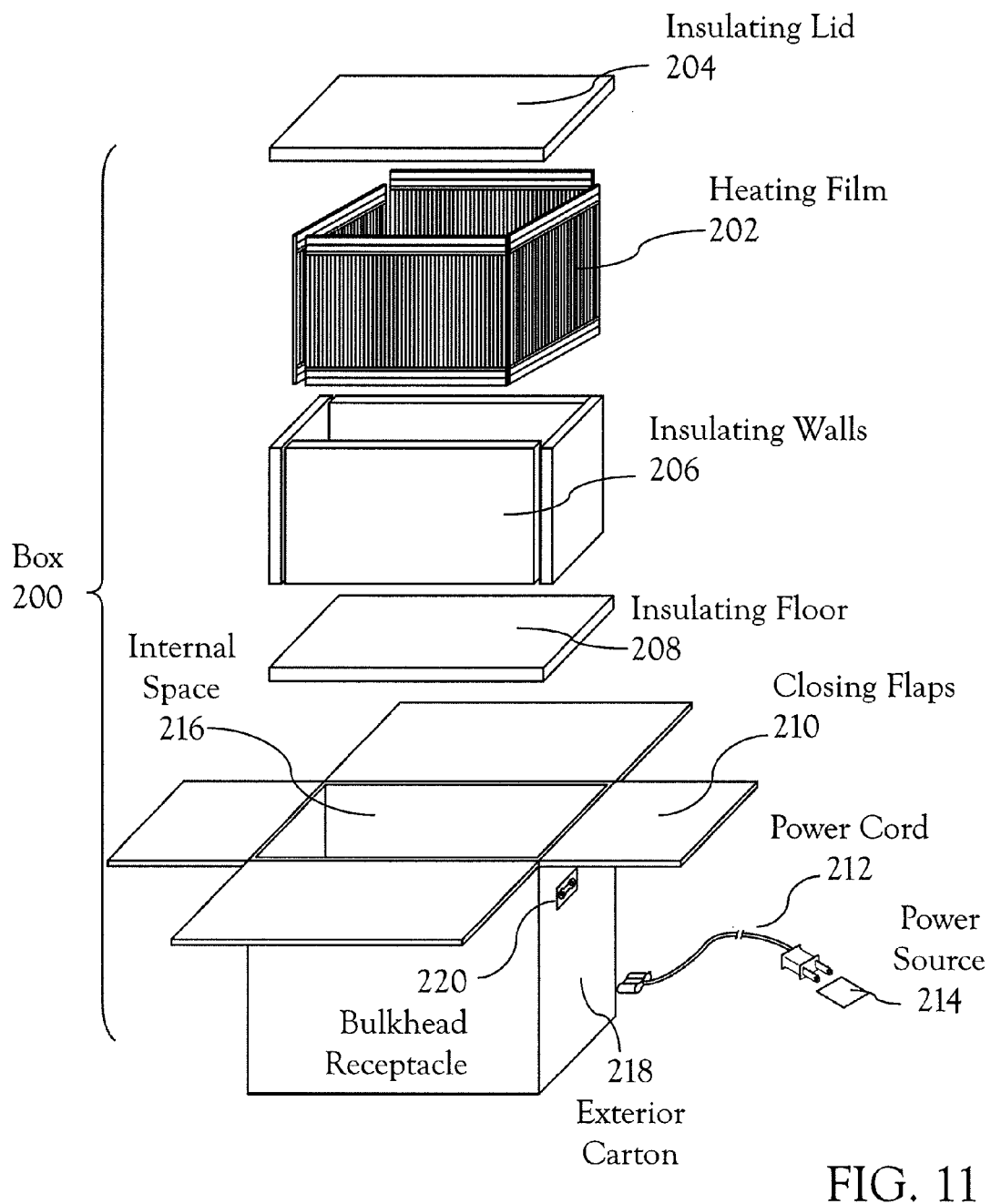
FIG. 11 is an exploded view of another embodiment of a heatable enclosure.

FIG. 11 illustrates another embodiment of an enclosure, which comprises a box 200. The box 200 comprises an exterior carton 218 that has a bulkhead receptacle 220 that is adapted to receive the power cord 212. The power cord 212 can plug into the power source 214 to provide power to the box 200. The insulating floor 208 and insulating walls 206 are placed in the internal space 216 of the exterior carton 218. A heating film 202, that is formed to fit inside the insulating walls 206, is placed on the interior surface of insulating walls 206. An insulating lid 204 is then placed on top of the box-shaped heating film 202. Closing flaps 210 can be closed upon activation of the power cord 212. The box 200 of FIG. 11 is a simpler design and less expensive design than the suitcase enclosure 100 of FIG. 1. Power cord 212 can simply be plugged into a power source 214 for a set period of time, which eliminates the need for a controller. Further, a user interface is not required with the box 200, but rather, the user simply keeps the power cord 212 plugged into the power source 214 and bulkhead receptacle 220 for a given period of time, such as 60 to 480 minutes. Bi-metallic switches can be used to control the current and temperature in the manner described with respect to FIG. 16. Box 200 provides a simple and cost effective manner of creating an enclosure to kill pests and can be easily constructed in an inexpensive manner. Again, the heating film 202 is disposed on multiple sides of the box 200 to ensure that heat is being applied from multiple surfaces, to ensure that the pests are killed or egress from the outer surfaces of the box 200.

Figure 12:
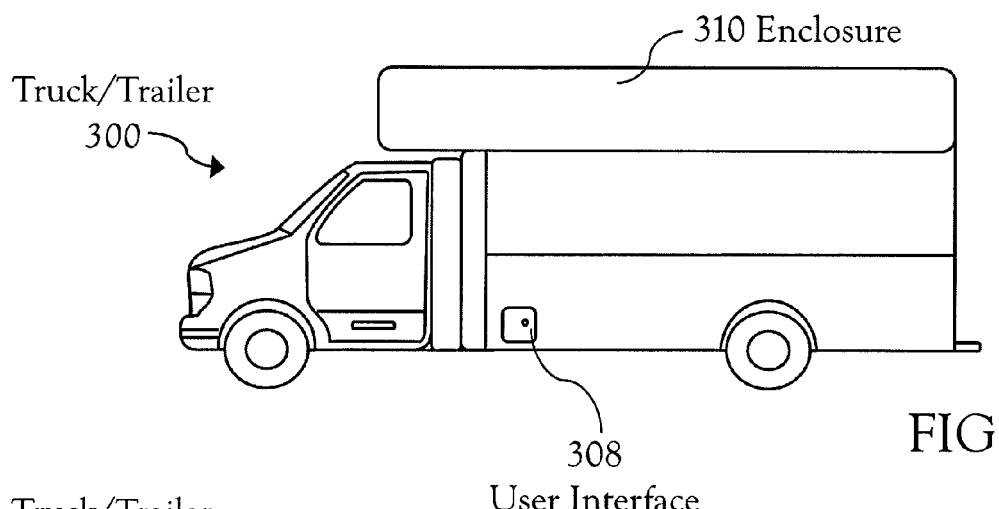
FIG. 12 is a side view of a truck that is outfitted to be a heated enclosure.

FIG. 12 is a side view of a truck/trailer 300 that includes an enclosure 310 that forms part of the truck/trailer 300. A user interface 308 is provided on an outside surface of the enclosure 310.

Figure 13:
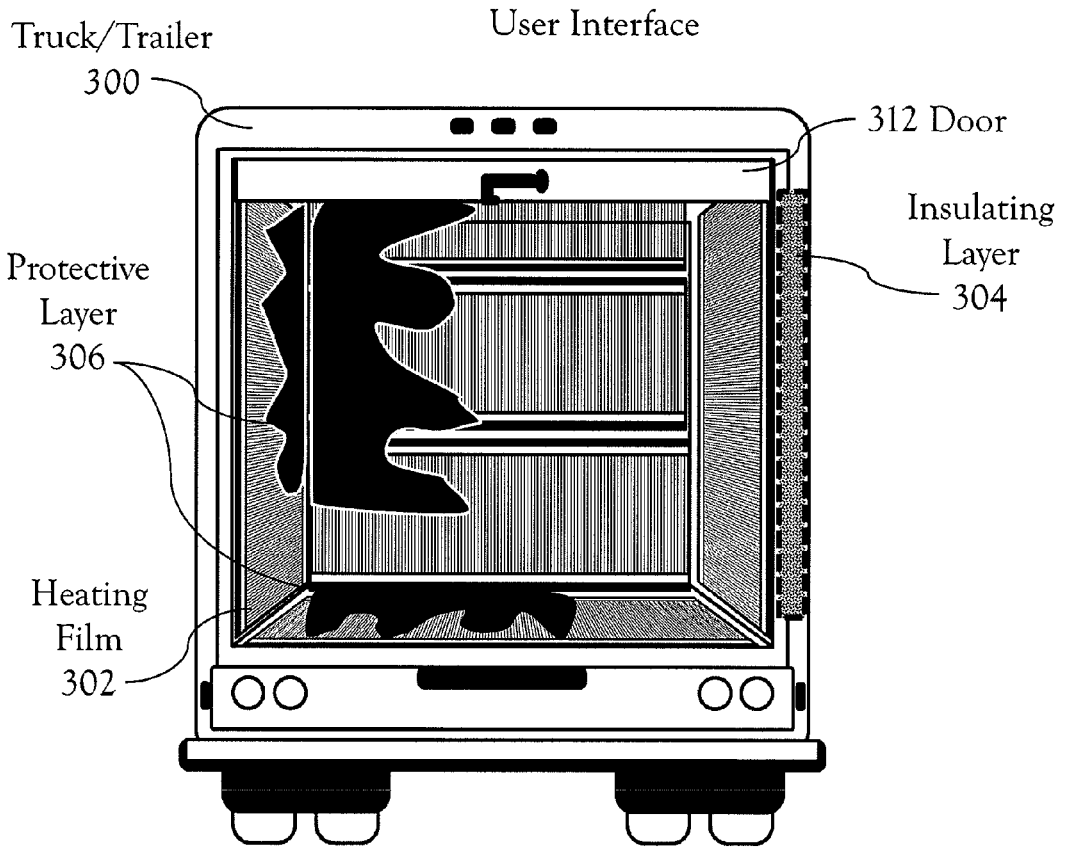
FIG. 13 is a back view of the truck of FIG. 12 illustrating a heating film, protective layer and insulating layer that are utilized to convert the truck to a heated enclosure.

FIG. 13 is a rear view of the truck/trailer 300 showing the door 312 in an open position. A rear view in FIG. 13 is a partial cutaway view showing portions of the protective layer 306 that covers the heating film 302. The heating film 302 is placed on the interior walls of the truck/trailer 300 and on a floor portion of the truck/trailer 300. An insulating layer 304 is shown in a cut-away portion of the sidewalls of the truck/trailer 300. The insulating layer 304 may comprise any desired type of insulating material that can be placed in the walls of the truck/trailer 300. Insulating layer 304 may be attached directly to the inside surface of the walls of the truck/trailer 300 or may constitute foam insulation that is injected into the walls of the truck/trailer 300. The heating film 302 can be formed in large sheets that are constructed to fit on the walls and the truck bed of truck/trailer 300. Each of the sections of the heating film 302 can then be wired to the user interface 308. The protective layer 306 may comprise a spray-on protective coating, such as used in truck bed liners. The protective layer 306 may be a homogeneous protective surface that is applied directly to the heating film 302 to provide a durable working surface to transport items for heat treatment. Various polymers can be used for the protective layer that can be sprayed on or directly applied to the heating film 302. These polymers may comprise polyurethanes, polyureas, pure polyureas and similar materials that have durable characteristics between −50° F. and 200° F. Coatings may include Rhino Extreme 21-55 available from Rhino Linings Corp., 9151 Rehco Road, San Diego, Calif. 92121. Other protective coatings can be used, such as Line-X Excess-350 available from Line-X Protective Coatings, 6 Hutton Center Drive, Suite 500, Santa Ana, Calif. 92707. Both of these protective coatings comprise spray-on elastomers that are easily applied over the heating film 302. Although FIGS. 12 and 13 illustrate a truck/trailer 300 having an enclosure 310, the identical process can also be used with stand-alone trailers.

Since bedbugs can be easily spread in furniture and other household and office items, the use of a truck or a trailer to kill pests, such as bedbugs, is extremely beneficial. For example, if bedbugs have infested furniture, including beds, couches, chairs, etc. in a home, the furniture can be removed and placed in the truck or trailer and subjected to one or more heat cycles within the trailer to kill the bedbugs. The furniture can then be placed back in the house with the assurance that the bedbugs have been exterminated. Further, if a user is moving from one location to another, the truck/trailer 300, or a similarly constructed trailer, can be used to transport furniture that may be infected with bedbugs. One or more heating cycles may be used to ensure that bedbugs are exterminated from the furniture and other household items during the transportation of the items to a new location. Further, new furniture that is being transported to a purchaser can also be treated to ensure that there has no been infestation of bedbugs or other pests. As further illustrated in FIG. 13, the heating film 302 is applied to multiple surfaces, including the floor surface of the truck/trailer 300, to ensure that the contents of the truck/trailer 300 are fully exposed to heat applied by the heating film 302. This ensures that pests are killed on the contents of the truck/trailer 300.

Figure 14:
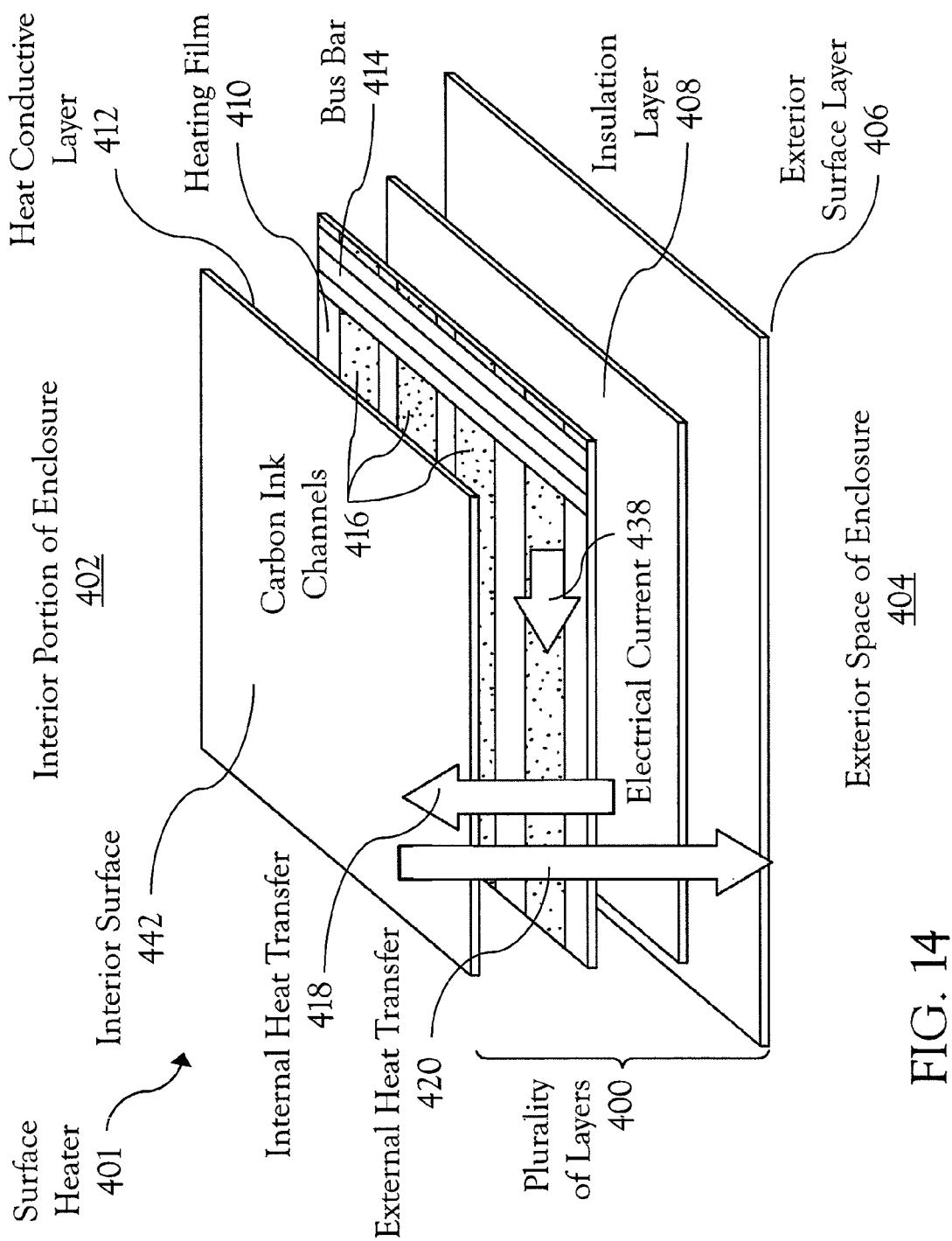
FIG. 14 is an exploded view of layers, which may comprise a portion of an enclosure.

FIG. 14 is an exploded view of a portion of an enclosure with a surface heater 401 that utilizes a heating film 410. The enclosure can comprise any desired type of surface heater 401 that has a plurality of layers 400. As illustrated in FIG. 14, the heating film 410 has a plurality of carbon ink channels 416 that pass the electrical current 438 from bus bar 414. The heat conductive layer 412 is disposed over the heating film 410 to protect the heating film 410 from damage and increase the heat uniformity to the interior surface 442. The heat conductive layer 412 can comprise any desired material that has at least a moderate degree of thermal conductivity. As such, internal heat transfer 418 to the interior portion of the enclosure 402 occurs preferentially over the external heat transfer 420 to exterior space of the enclosure 404 of the enclosure, since insulation layer 408 is disposed between the heating film 410 and the exterior surface layer 406. Exterior surface layer 406 can be used to support the insulation layer 408. The exterior surface layer 406 can be selected from a numerous and wide variety of materials, such as those conventionally used in the external wall construction of luggage, including soft and hard luggage, such as metal, fabric, plastic, fiberglass or similar materials, to provide the exterior surface layer 406 with the proper rigidity necessary to create the enclosure. In addition, the exterior surface layer 406 may comprise materials that are conventionally used for the exterior wall construction of various containers as illustrated in FIG. 11, such as paperboard, cardboard, corrugated plastic, or similar materials commonly used by the packaging industry. The exterior surface layer 406 may be selected depending upon the intended use of the enclosure and the ability to properly enclose the insulation layer 408 and the heating film 410. The insulation layer 408 may be disposed adjacent to, and mounted on, the exterior surface layer 406. The insulation layer 408 may be selected from a numerous and wide variety of materials to provide a heat transfer barrier between the interior portion of the enclosure 402 and the exterior surface layer 406 surrounding enclosure. The internal heat transfer 418 to the internal portion of the enclosure 402, versus the external heat transfer 420 to the external space of the enclosure 404, is determined by the insulated value of the insulation layer 408, the thermal conductivity of the heat conductive layer 412, as well as the temperature difference between the interior portion of the enclosure 402 and the exterior space of the enclosure 404. It is desirable to have external heat transfer 420 to the exterior surface layer 406 to cause pests, such as bedbugs, to egress from the exterior surface layer 406. At the same time, it is desirable to have an insulation layer 408 that is sufficient to cause the internal heat transfer 418 to the interior portion of the enclosure 402, so that a sufficient amount of heat is generated in the interior portion of the enclosure 402 to kill pests, such as bedbugs. Accordingly, the insulation layer 408 may comprise a plastic sheet material that is applied to the exterior surface layer 406, such as foam board, closed or open cell foam, sheet or a spray foamed material, such as polyurethane foam, corrugated cardboard, fiber fill, such as bamboo fill, cotton fill, synthetic fiber fill, such as polyester fill, air filled sheets, or bubble material or similar materials.

Figure 15:
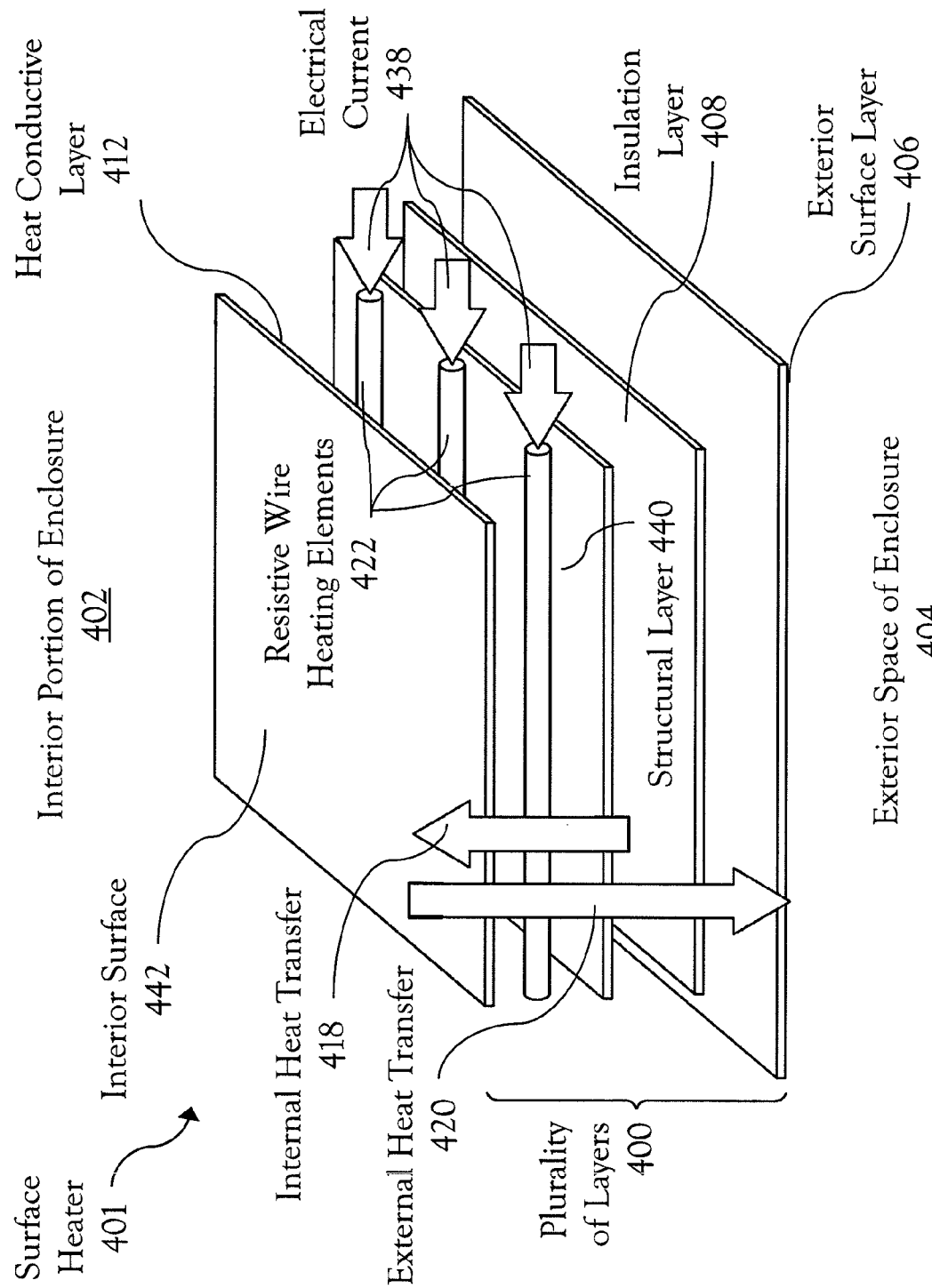
FIG. 15 is an exposed view of layers, which may comprise a portion of another embodiment of an enclosure.

FIG. 15 is another view of the construction of an enclosure with a surface heater 401 that utilizes resistive wire heating elements 422. FIG. 15 discloses a plurality of layers 400 that form an enclosure. An electrical current 438 is applied to resistive wire heating elements 422, which generate heat by method of Joule heating. The resistive wire heating elements are supported by structural layer 440. An insulation layer 408 is disposed between the structural layer 440 and the exterior surface 406. The insulative qualities of the insulation layer 408 control the amount of internal heat transfer 418 to the interior portion of enclosure 402, versus the amount of external heat transfer 420 to the exterior space of the enclosure 404. A heat conductive layer 412 is placed over the resistive wire heating elements 422 to protect the resistive wire heating elements 422 from damage. Heat conductive layer 412 may comprise any desired heat conductive layer, including plastic materials and other suitable material. The resistive wire heating elements 422 can be made from resistive carbon fiber wire, electrically resistive ribbons, or other similar materials that are capable of generating heat in response to the flow of electrical current 438. Electrically resistant wires and ribbons can be made from nickel, iron, nickel-chrome alloys, nickel-iron alloys, and similar materials. Wires and ribbons suitable for use with the invention include Balco alloy, Evanoham, Alloy R, Karma Mid-Ohm and similar products. Pelican Wire Co Inc, 3650 Shaw Boulevard, Naples, Fla. 34117-8408, telephone 1 (239) 597-8555; Kanthal 1 Commerce Blvd, Palm Coast, Fla. 32164; Telephone: +1 (386) 445 20 00; Fax: +1 (386) 446 22 44

FIG. 16 is an illustration of a surface heater that uses resistive wire heating elements 422. FIG. 16 is one embodiment illustrating the manner in which a resistive wire heating layer can be constructed to fit within conventional containers, enclosures, luggage, suitcases, garment bags, briefcases, duffle bags, backpacks, or the like. As shown in FIG. 16, the sidewall section 430 can be disposed along the sidewall of a container, such as a box. Floor section 426 can be disposed along a lower portion, while the lid section 428 can be disposed on an upper portion, of a container. Structural layer 440 may comprise an insulating layer, a thermal conductive layer, or a combination of the two. As illustrated in FIG. 16, one single structure, in the form of a heating shell 444, can be used to surround the interior or exterior sides of a heating enclosure in one simple and easy to implement device. The specific geometry of the heating shell 444, illustrated in FIG. 16, can be modified to produce various three-dimensional shapes when folded. Box shapes, rectangular shapes, cylindrical shapes, frusto-conical shapes, pyramid shapes, and other desired shapes can be formed depending upon the particular implementation.

FIG. 16 also illustrates a pair of thermal switch 432 devices that function to control the temperature of the heating layer illustrated in FIG. 16. The thermal switch 432 may take the form of a bimetallic switch that controls the flow of current based upon the output temperature of the heating layer illustrated in FIG. 16. In this manner, the thermal switch 432 is capable of controlling the application of current from power cord 434 to the resistive wire heating elements 422.

Figure 17:
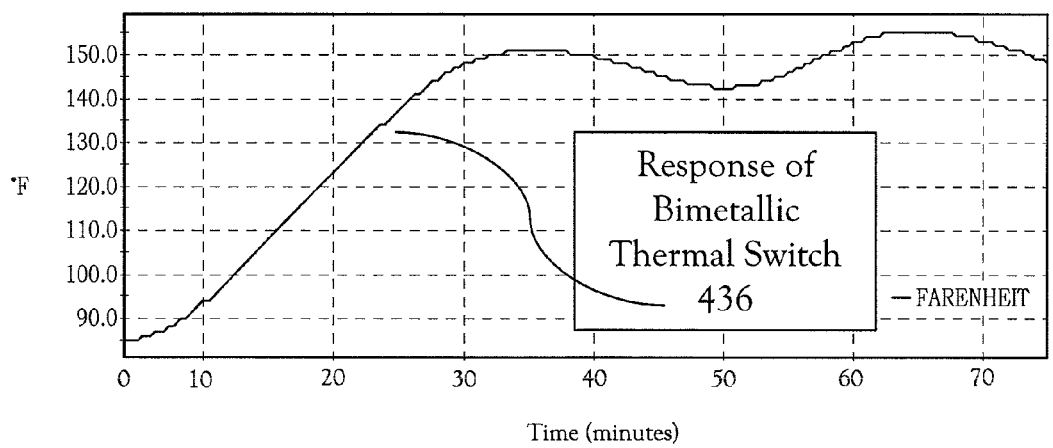
FIG. 17 is a graph of the response of a bi-metallic thermal switch.

FIG. 17 is a plot of the response of a bimetallic thermal switch 436 based on temperature over a period of time. As shown in FIG. 17, the bimetallic thermal switch is capable of maintaining the heating element at a temperature between approximately 140° F. and 160° F. Installation of the bimetallic switches in the circuit of the heating element illustrated in FIG. 16 allows the heating element to automatically maintain a predetermined temperature between approximately 140° F. and 160° F. Bimetallic switches are available from Cantherm, 8415 Mountain Sight Avenue, Montreal (Quebec), H4P 2B8, Canada. Typical switches that can be used include Part No. F20A07005ACFA06E, which switches at 70° C. Part No. C5705025Y is a bimetallic thermal switch that switches at 50° C.

Figure 18:
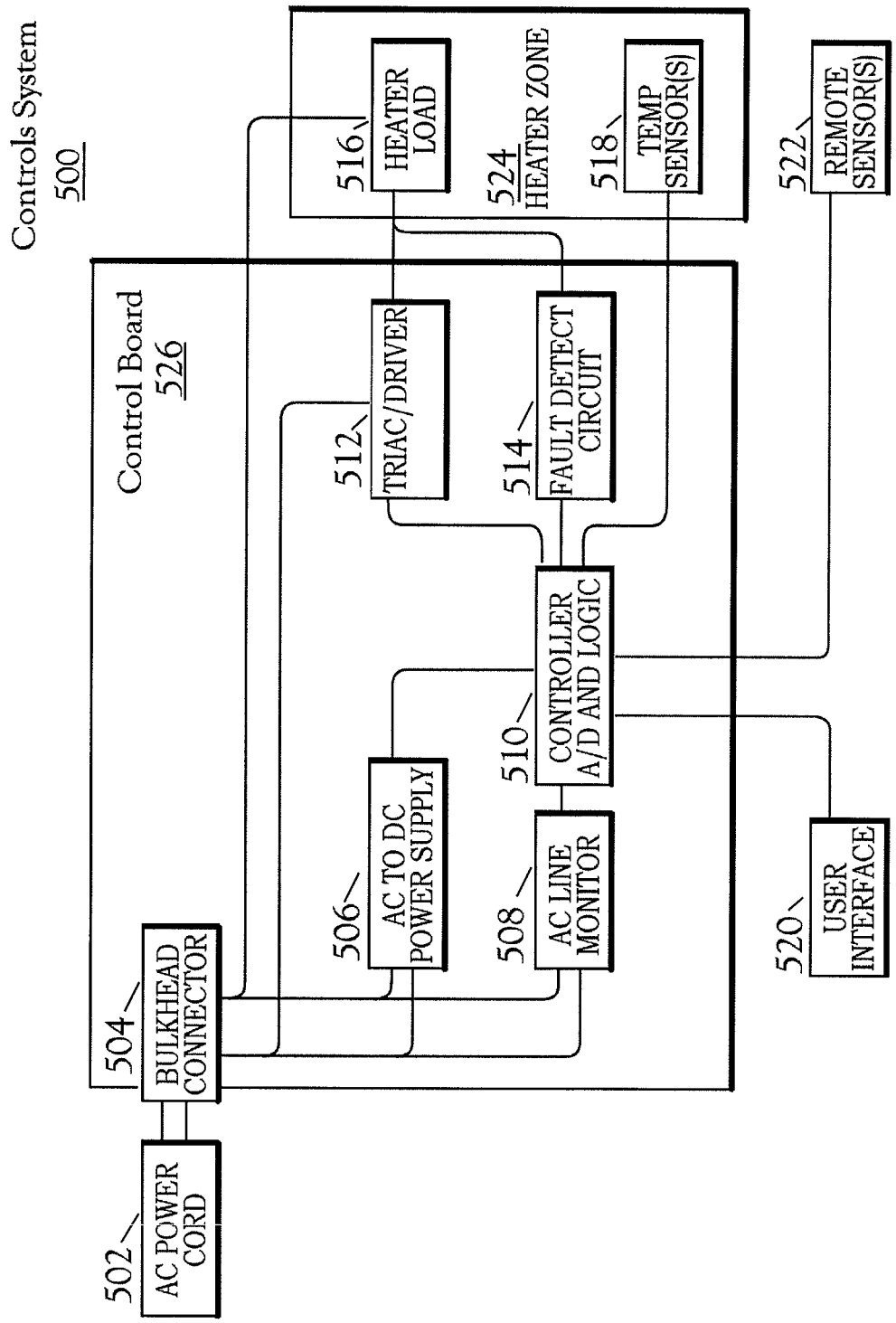
FIG. 18 is a block diagram illustrating the structure and layout of an embodiment of a control system.

FIG. 18 is a schematic block diagram of an embodiment of a control system 500 that is suitable for use with the present invention. As illustrated in FIG. 18, the control system 500 includes AC power cord 502, control board 526, heater zone 524, user interface 520, and remote sensors 522. The AC power cord 502 can be connected to a power source to supply power to a bulkhead connector 504. Bulkhead connector 504 may comprise a male prong socket for the AC power cord 502. Power from the bulkhead connector is supplied to an AC to DC converter 506, which converts an AC signal to a DC voltage. Power sources in some countries operate on 220-240 volts, rather than US and Canada which operate at 120 volts AC. In that regard, AC line monitor 508 detects the input voltage and generates a signal that is supplied to the controller 510, indicating the voltage range to the input signal from the AC to DC converter 506. Controller 510 receives user inputs from user interface 520. User inputs may include control signals to activate the heating system, duration of the heating time, desired temperatures, and other input information. User interface 520 also receives data from the controller 510 that is displayed on the user interface 520 indicating the operation of the control system 500. Controller 510 includes analog to digital circuits and logic circuits for carrying out the logical operations of the control system 500. Driver circuit 512 is controlled by the controller 510 to supply current to the heater load 516. Driver circuit 512 may use a triac to control the current applied to the heater load 516. Driver circuit 512 is connected directly to the power supply from the bulkhead connector 504 to supply power directly to the heater load 516, which is disposed in the heater zone 524. A fault detection circuit 514 is connected to the heater load 516 to determine if there are any faults in the heater load 516. If so, a signal is transmitted from the fault detection circuit 514 to the controller 510 to turn off the power supplied by the driver circuit 512. Temperature sensors 518 provide data to the controller 510 for operation of control system 500. In addition, remote sensors 522 provide additional information that assists the controller 510 in proper operation of the control system 500. Temperature sensors 518 may comprise surface temperature sensors, such as surface temperature sensor 120. Remote sensors 522 may comprise a central temperature sensor, such as central temperature sensor 118, illustrated in FIG. 1.

Controller 510, illustrated in FIG. 18, regulates the power supplied to the heater load 516. In this manner, the temperature generated by the heater load 516 then can be increased or decreased in response to the information provided by temperature sensors 518, and remote sensors 522. Controller 510 can increase the temperature of the heater load 516 at a predetermined rate to aggressively approach a surface target temperature. Controller 510, together with the temperature sensors 518, and remote sensors 522, can be considered to be a closed proportional-integral derivative circuit. Using a controlled fixed rate of increase in the power applied to heater load 516 can reduce the thermal shock to the heat treatable materials that are disposed within the interior space of the heating enclosure. A triac used in the driver circuit 512 clips the sinusoidal waveform of the AC circuit that is applied from the bulkhead connector 504 to reduce delivered power. For example, to cut the delivered power by 50 percent on a 60 hertz system, the triac would clip half of the waveform. Although only a single heater zone 524 is illustrated, multiple heater zones may be utilized. In that case, controller 510 can function to reduce instantaneous power consumption by zero-cross switching and distributing the AC power across the multiple heating zones. For example, if a first heating zone requires 25 percent power and a second heating zone requires 50 percent power, the controller can synchronize a first triac to conduct for 15 cycles per second. The controller can also control a second triac to conduct 30 cycles per second and stop conducting for the next 15 cycles per second. In this manner, multiple triacs can be used to supply power to different heating loads.

Referring to Table 1, a preselected temperature and the period of time for treatment can vary depending on the pest which is being caused to egress from within, or from the external surface of, the enclosure body, or which is being killed within the enclosure body, or on the external surface of the enclosure body, in association with the heat treatable material. For the purposes of this invention the term "pest" encompasses a wide range of pathogens, molds, or insects (whether as adult, larvae, or eggs).

TABLE 1

|  |  | Temperature | Time |
| --- | --- | --- | --- |
| Pathogen | Enteric viruses | 60 C. | Rapidly |
|  | *Salmonellae* | 60 C. | 20 Hours |
|  | *Shigellae* | 55 C. | 60 Minutes |
|  | *E. coli* | 60 C. | Rapidly |
|  | *Entamoebahystolytica* cysts | 50 C. | 5 Minutes |
|  | Hookworm eggs | 50 C. | 5 Minutes |
|  | Roundworm eggs | 55 C. | 120 Minutes |
| Molds | Wood Fungi (Staining Fungi) | 66 C. | 75 Minutes |

TABLE 1-continued

|  |  | Temperature | Time |
| --- | --- | --- | --- |
|  | *Basidiomycotina* | 50 C. | N/A |
|  | *Poria* - Wood Eating Fungi (*Meruliporia Incrassata*) | 66 C. | 75 Minutes |
|  | *Fomes* (*Fomitopsis Rosea*) | 66 C. | 75 Minutes |
|  | *Stachybotrys Chartarum* | 60 C. | 30 Minutes |
|  | *Aspergillus Alutaceus* | 62 C. | 20 Minutes |
|  | *Aspergillus Acandidus* | 62 C. | N/A |
|  | *Aspergillus Ustus* | 62 C. | 25 Minutes |
|  | *Aspergillus Wenti* | 63 C. | 25 Minutes |
|  | *Aspergillus Niger* | 63 C. | 25 Minutes |
|  | *Alternaria Alternata* | 63 C. | 25 Minutes |
| Insects | Bed Bug Adults & Nymphs | 45 C. | 15 Minutes |
|  | Bed Bug Eggs | 45 C. | 60 Minutes |
|  | German Cockroach - Adult Male | 49 C. | 27 Minutes |
|  |  | 54 C. | 7 Minutes |
|  | Flour Beetle | 49 C. | 16 Minutes |
|  |  | 54 C. | 4 Minutes |
|  | Drywood Termite Nymphs | 49 C. | 30 Minutes |
|  |  | 54 C. | 6 Minutes |
|  | Agentine Ant (Adults) | 49 C. | 4 Minutes |
|  |  | 54 C. | 1 Minute |

Hence, the various embodiments disclosed herein provide various ways of killing bedbugs, or other pests, in containers and causing such pests to egress from surfaces of the container. Various types of containers are disclosed, including suitcases, standard boxes, trailers, trucks and similar devices. The various types of containers and enclosures can be retrofit with a heating film or a resistive wire heating element to create an enclosure that is capable of killing pests. These enclosures can also be retrofit with various controllers, including a user interface, as well as simple controllers, such as a bimetallic switch. This system uses simple surface heaters on multiple sides of the enclosure, such as heating film and resistive wire heating layers. Inexpensive control systems are used, including bimetallic switches, closed loop controllers, and other systems. Heating films are ideal for use on the various enclosures since they are low cost, extremely thin, lightweight and pliable, and can produce optimal temperature ranges for killing pests. Further, infrared wavelengths, on the order of 50 to 1000 nanometers, that are generated by the heating film, allow the heat to penetrate materials within the enclosure, rather than relying upon convective air currents. Heating films are safe to use and can be either custom designed for application directly to an enclosure or provided in a pre-made film having various widths.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for killing pests on heat treatable materials, the system comprising:
   a suitcase enclosure configured to receive said heat treatable materials, said suitcase enclosure formed of a plurality of wall portions and a lid positionable to close an interior space of the suitcase enclosure, wherein the plurality of wall portions and the lid defining an exterior surface and an inner surface that surrounds the interior space of said suitcase enclosure, said exterior surface having external surfaces;

an insulating layer disposed in said interior space adjacent said inner surface;

a heating layer configured to generate heat, said heating layer disposed in said inner space along said insulating layer such that the heating layer is disposed on said plurality of wall portions and said lid; and wherein said insulating layer (1) traps sufficient heat within said interior space to kill bedbugs and (2) provides heat transfer from said heating layer to said exterior surface to elevate a temperature of said external surfaces to a temperature sufficient to kill bedbug eggs.

2. The system of claim 1, further including a control device operatively coupled to said heating layer, said control device configured to control electrical current to flow through said heating layer.

3. The system of claim 2 wherein said control device comprises a bi-metallic switch configured to control said current flowing through said heating layer.

4. The system of claim 2 wherein said control device comprises:

at least one temperature sensor disposed in said interior space and configured to detect temperatures in an interior portion of said interior space and generate temperature signals indicative of said temperatures; and a controller configured to receive said temperature signals and control said electrical current to flow through said heating layer.

5. The system of claim 1 wherein said heating layer is formed of a resistive wire heating layer.

6. The system of claim 5 wherein said resistive wire heating layer includes a plurality of resistive wire heating elements.

7. The system of claim 6 wherein said resistive wire heating layer includes a structural layer supporting said plurality of resistive wire heating elements.

8. The system of claim 6 wherein said resistive wire heating elements generate heat by Joule heating.

9. The system of claim 6 wherein said heating layer includes a heat conductive layer disposed over said plurality of resistive wire heating elements.

10. The system of claim 5 wherein:

said heating layer includes a heat conductive layer disposed over said resistive wire heating layer; and said resistive wire heating layer further includes a liner disposed over said heat conductive layer.

11. The system of claim 10 wherein said liner transmits heat conducted from said heat conductive layer.

12. The system of claim 1, wherein said insulating layer provides heat transfer from said heating layer to said exterior surface to elevate the temperature of said external surfaces to at least 45° C.

13. A suitcase for killing pests on heat treatable materials, the suitcase comprising:

a suitcase enclosure configured to receive said heat treatable materials, said suitcase enclosure including (1) a main enclosure comprising a plurality of sides defining an interior space to receive the heat treatable materials, and (2) a hinged lid positionable to close the interior space of the main enclosure, said main enclosure and hinged lid having a plurality of layers, including:

an exterior surface layer having an outer surface and an inner surface, said inner surface disposed relative to the interior space;

an insulating layer disposed in said interior space adjacent said inner surface; and a heating film configured to receive electrical current and to generate heat, said heating film being disposed in said interior space along said insulating layer such that said heating film is disposed on said hinged lid and on the plurality of sides of the main enclosure; and wherein said insulating layer (1) traps sufficient heat from said heating film within said interior space of the main enclosure and (2) provides heat transfer from said heating film to said exterior surface layer to elevate the temperature at said outer surface; and a control device operatively coupled to said heating film, said control device configured to control the electrical current to flow through said heating film so that (1) said heat penetrates and heats said heat treatable materials when disposed in said suitcase when said hinged lid closes the interior space to a sufficiently high temperature, for a sufficiently long period, to kill bedbugs on the heat treatable materials and (2) said heat transfers to said exterior surface to generate a temperature at said outer surface sufficient to kill bedbug eggs.

14. The suitcase of claim 13 wherein said heating film includes resistive heating elements.

15. The suitcase of claim 13 wherein said hinged lid attaches to said main enclosure via matably lachable parts.

16. The suitcase of claim 13 wherein the plurality of sides of said main enclosure form four side wall portions and a bottom portion of said main enclosure.

17. The suitcase of claim 16 wherein said heating film is disposed along said four side wall portions surrounding the interior space, disposed along said bottom portion.

18. The suitcase of claim 13 wherein said suitcase enclosure is rectangular in shape defining a rectangular shaped said interior space.

19. The suitcase of claim 13, wherein the heating film comprises an electrically resistive ink layer.

20. The suitcase of claim 13, wherein said insulating layer provides heat transfer from said heating film to said exterior surface layer to elevate the temperature of said outer surface to at least 45° C.

* * * * *